Patented July 5, 1932

1,865,628

UNITED STATES PATENT OFFICE

FRAZIER GROFF, OF VERONA, NEW JERSEY, ASSIGNOR TO BAKELITE CORPORATION, OF NEW YORK, N. Y., A CORPORATION OF DELAWARE

COATING COMPOSITION

No Drawing. Application filed July 6, 1929. Serial No. 376,501.

This invention relates to compositions more particularly intended as coating compositions suitable for wood, metals and other materials, and which may be either of a transparent or translucent nature or combined with suitable pigments. Such compositions are usually applied in the form of varnishes or solutions containing volatile solvents, which solvents upon evaporation leave continuous and homogeneous films upon the articles coated.

For this purpose solutions containing esters of cellulose such as nitrocellulose, etc. have obtained a great popularity which in part at least is ascribable to the toughness and the resistance to wear characteristic of cellulose films. As a rule, however, a large number of coats of such solutions are usually found necessary on account of the thinness of film deposited by them and this entails a considerable loss in solvents as well as a long period of time.

According to the present invention coating compositions are provided having the transparency of varnishes but differing from the transparent cellulose ester compositions heretofore known in that they are applicable as solid films or veneers of any desired thickness and not necessarily as solutions, thereby obviating the necessity of solvents. Films or veneers of these compositions furthermore have the toughness and resistance to wear characteristic of cellulose compositions but are superior to films of the cellulose ester type in the properties of non-inflammability, hardness, adhesiveness and chemical inertness.

The present invention moreover provides moldable compositions of the phenolic type of great commercial utility for molding for they do not become so fluid as to objectionably exude or flow away from a mold during a molding operation and yet have sufficient flow or plasticity to properly fill a mold under pressures materially below 600 pounds to the square inch, for example about 250 pounds to the square inch and even as low as 100 pounds to the square inch under customary temperatures, and therefore admirably adapted for molding on or about cores of wood, fibrous substitutes for wood, asbestos board, etc. Moreover they possess yieldability or give to the extent that, when molded in contact with cores of wood, metal or other materials, products are obtained in which the molded covering does not crack or break loose either in the molding operation or under subjection to changing conditions of heat or moisture. Another most useful property which these compositions possess is workability, that is, their molding quality is not exhausted with the first molding but they can be reworked afterward into other shapes. These and other objects of the invention will become apparent from the following description.

Briefly stated the invention comprises in its preferred form the mixing of a cellulose in a gelatinizable form, such as substantially pure cellulose, cotton flock, alpha cellulose, etc., with a plasticized resinous product of the phenol-formaldehyde type and mechanically rolling the mixture until a transparent structure results devoid of any apparent fibrous structure to yield a product that in these respects is similar to the gelatinized products obtained by beating cellulose in an aqueous suspension or by treating cellulose with solvents in accordance with the practice obtaining in the fiber and similar industries. Sulfite pulp can be rolled with a plasticized resinous product to a homogeneous condition and likewise an alkali-treated cellulose, for example, cotton flock steeped in a 25% sodium hydroxide solution and then washed and neutralized; a so-treated cellulose requires but relatively little mixing or rolling with the resinous product to yield smooth and homogeneous mixtures.

The resinous products found preferable for this purpose are the phenol resinoids, that is, those obtained by reacting a phenol and a methylene-containing agent, such as formaldehyde, in proportions to yield products hardenable or convertible from an initial fusible and soluble or potentially reactive state by the action of heat to a final infusible and insoluble state. These resinoids when mixed with suitable plasticizing agents are found to readily penetrate the cellulose fibers upon intimate admixture which seems to cause partial swelling and a consequent disappearance of the fiber structure. Plasticizers found suitable for this purpose are high boiling solvents such as dibutyl phthalate, tricresyl-phosphate, etc., but I prefer to use as plasticizers synthetic products having the resinoid characteristic of hardening to an infusible and insoluble condition and obtained in the reaction of a phenol with a fatty oil, such as tung oil. Such reactive phenol-oil resinoids are produced in the presence of a so-called promoter (such as phosphoric acid and the like) when the relative amounts of a phenol to a fatty oil are substantially in equivalent molecular proportions; for example, one molecular proportion of tung oil which is mainly a triglyceride, and here so regarded, yields a resinoid when reacted with three molecular proportions of phenol in the presence of phosphoric acid. The reaction also proceeds in the presence of excess phenol which acts as a solvent and gelatinization occurs in the solvent upon heating to about 120–160° C.; as the heating is further continued the mass gradually loses the excess of free phenol and becomes increasingly tougher and harder until finally when substantially all the excess phenol is driven off there remains a tough, solid, acetone-insoluble resinoid.

What constitutes a resinoid sufficiently plasticized for the purposes of this invention cannot be stated within definite limits because it depends upon the nature of the resinoid and its method of manufacture as well as on the character of the plasticizer. For instance a resinoid may be so prepared from commercial cresol as to include free cresol to an extent that no additional plasticizer is needed. On the other hand a resinoid with a large percentage of plasticizer present can be used, a large proportion having the effect of rendering the molding process a very slow one on account of the relatively high fluidity and the necessity of cooling the molded article to a firm solid condition. As a general rule, however, I have found that the addition of from 30 to 40 percent of a plasticizer of the nature of dibutyl phthalate to a phenol-formaldehyde resinoid substantially free from phenol or other softening agents provides a plasticized resinoid that is satisfactory.

As a specific illustration, a phenol-methylene resinoid plasticized with a phenol-oil resinoid is obtained by the following method. About 150 parts by weight of a tung oil is reacted with about 100 parts of phenol in the presence of one part of phosphoric acid under a reflux for about 5 hours at about 195–205° C. A weight of phenol that is about equal to the weight of the reacted product and about ⅓ as much hexa are then added and the mass is reacted until it is quite viscous. The product obtained contains about equal parts of each resinoid.

There are no well established limits with regard to the relative proportions of the phenol-oil and the phenol-methylene resinoids, except in so far as the properties of the composition are modified to the extent that either one predominates over the other; for example the reactivity of the molding composition increases with the proportion of phenol-methylene resinoid, but on the other hand the give or yield of the composition is much influenced by and roughly proportionate to the amount of phenol-oil resinoid. Consequently the amount of free phenol and the amount of hexa added to react therewith may be varied within wide limits depending on the properties desired in the composition. The proportions given in the example yield a composition that has been found to be satisfactory both as to reactivity and as to yieldability or give under normal changes of temperature and moisture of articles prepared from compositions containing them. Molding properties however are somewhat improved if paraform is substituted in part for the hexa in that less ammonia is given off during a molding operation; approximately about equal parts of hexa and paraform are found preferable.

A resinoid plasticized in this manner or with any other suitable agent can be incorporated with the cellulose fiber in various ways. For example a varnish can be made by adding solvents, such as benzol, alcohol, etc. or their mixtures, to the viscous resinoid mass described to yield a varnish containing for instance about 50% resinoid, and the varnish can then be further heated if desired under a reflux until the requisite viscosity has been attained. The varnish so formed is added to cotton flock in the proportion of about 2 parts of varnish to 1 of filler and is thoroughly mixed after which the mixture is dried under a partial vacuum to remove the solvent; the composition thus obtained may be further heated to partially "advance" the resinoid, i. e. bring it nearer to the hardened state. Alpha cellulose and other substantially pure forms of cellulose can be substituted for cotton flock. A lubricant consisting of a small amount of lime and calcium stearate (about 2% of each) is preferably included; in place of lime and calcium stearate, carnauba, ceresin, or candelilla wax or the like can be used. Furfural or other plasticizing agents can be included as well. The product is passed between rolls and as the plasticized resinoid penetrates the cellulose fibers the fibrous structure is apparently lost. The rolling is continued until the desired homogeneity and density has been obtained.

Instead of incorporating the plasticized resinoid in the varnish form with the cellulose filler, the resinoid as obtained before the addition of volatile solvents can be kneaded with the filler and the composition then rolled to a homogeneous condition. Long rolling between differential rolls is not conducive to products of maximum strength and impregnation with the resinoid varnish may for this reason be preferable.

Retardants such as rosin, ester gum, glycerol-phthalic anhydride resinoid products, etc. can be included either by addition to the digestion mix or to the resinoid composition to reduce the activity of the phenol-methylene components. A particularly desirable additional ingredient to the composition for this purpose is cellulose acetate which acts not only as a retardant of the polymerization of the phenol-methylene component but also serves to promote the mixing of the plasticized resinoid and the cellulose filler. Shellac or other natural resins can also be incorporated in the resinoid mixture.

The compositions obtained in this manner may be applied either in a powder or rolled sheet or veneer form to provide coatings or coverings. The latter form permits a more uniform distribution of the coating composition and sheets rolled from the composition specifically described above and in thicknesses of about one tenth of an inch and less, have been satisfactorily applied to a wooden base material under temperatures of about 135° C. and pressures of about 250 pounds to as low as 100 pounds to the square inch, for about five to ten minutes, yielding smooth uniform surfaces and having strong adherence to the base material.

As the rolled sheet compositions prepared with cellulose in the gelatinizable or substantially pure form are transparent or nearly so, when pigments or similar opaque substances are omitted, their application in this form to wood, etc. reveals the grain or other markings that are on the surface of the material so covered. They can therefore be used in place of other coating materials such as varnishes, lacquers, etc., or they can be pigmented to be used instead of enamels, paints, etc. with the manifest advantages over such coated materials of an absence of volatile solvents and a transformation by means of a single operation requiring but a few minutes into a finished final product having a resistant weatherproof finish.

It is characteristic of the compositions of this invention that they possess yieldability or give to the extent that they can be pressed or molded into contact with or about wood, metal or other dissimilar materials, to produce articles in which the covering does not crack or break loose either during its application or under subjection to changing conditions of heat or moisture. Another most useful property which compositions made from plasticized resinoids in accordance with this invention possess is workability, that is, their molding quality is not exhausted with the first application but they can be reworked into other shapes. For example the composition can be molded under heat and pressure from powdered or sheet form into the form of separate halves of a shell, a core can then be enclosed between the halves and upon applying heat and pressure it is found that the halves weld together into homogeneous whole. Welding the parts together does not require that the pressures be transmitted to the enclosed cores as the molds can be fitted with lands to limit the relative movement; in so welding it may be desirable to supply surplus resinoid material at the contacting edges to insure complete welding. In this way a steering wheel for instance can be rapidly finished, for the shell parts having been molded under heat and pressure previous to their placement about the core, the molded parts center the core within the mold and heat and pressure for welding alone is required. Wire coils can likewise be enclosed in air-proof coverings.

In addition to the specific uses mentioned these compositions are suitable for finishing table tops and other furniture elements, doors, paneling interior wood or composition finishes, etc. They are also suitable for the manufacture of toilet seats and similar articles, and in general the compositions can be used as veneers in much the same manner that rubber is handled.

In applying pressure or in molding these compositions it is desirable that chromium-plated molds or plates be used as there is no sticking or staining when the contacting surfaces are chromium-plated.

I claim:

1. A process of preparing a composition which comprises forming a varnish by the addition of a solvent to a plasticized phenolic resin, mixing cellulose fiber therewith, removing the solvent, and rolling the mixture to a homogeneous condition.

2. In a process of preparing a composition the step which comprises rolling cellulose fiber with a plasticized phenolic resin to a substantially homogeneous sheet condition.

3. Composition suitable for coatings comprising substantially pure cellulose in admixture with a phenol-methylene resinoid including a phenol-oil resinoid as a plasticizer.

4. Composition suitable for coatings comprising substantially pure cellulose and about an equal part of a phenol-methylene resinoid including a phenol-oil resinoid as a plasticizer.

5. Process of preparing compositions suitable for coatings which comprises reacting tung oil with phenol, adding additional amount of phenol and a proportion of hexamethylenetetramine sufficient to react with the phenol-oil product and the added phenol to impart resinoid properties, reacting the mass to a viscous condition, adding said mass to cotton flock in about equal proportions, and rolling the mass to a homogeneous condition.

6. Process of preparing compositions suitable for coatings which comprises reacting a phenol with a fatty oil and a methylene-containing agent, incorporating a phenol-methylene resinoid therewith, adding substantially pure cellulose to the resinoid mass, and rolling the composition to a homogeneous condition.

7. Composition suitable for coatings comprising a plasticized phenolic resin and cellulose brought to a substantially transparent structure devoid of apparent fibrous structure through intimate admixture with the resin.

8. Composition suitable for coatings comprising a plasticized phenolic resin and cellulose brought to a substantially transparent structure devoid of apparent fibrous structure through rolling with the resin.

In testimony whereof, I affix my signature.

FRAZIER GROFF.